United States Patent
Toyoda et al.

(10) Patent No.: US 10,476,300 B2
(45) Date of Patent: Nov. 12, 2019

(54) UNINTERRUPTIBLE POWER SUPPLY DEVICE

(71) Applicant: TOSHIBA MITSUBISHI-ELECTRIC INDUSTRIAL SYSTEMS CORPORATION, Chuo-ku (JP)

(72) Inventors: Masaru Toyoda, Chuo-ku (JP); Kenta Hayashi, Chuo-ku (JP); Akihiro Yamanishi, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 15/573,731

(22) PCT Filed: Jul. 16, 2015

(86) PCT No.: PCT/JP2015/070405
§ 371 (c)(1),
(2) Date: Nov. 13, 2017

(87) PCT Pub. No.: WO2017/009998
PCT Pub. Date: Jan. 19, 2017

(65) Prior Publication Data
US 2018/0152046 A1    May 31, 2018

(51) Int. Cl.
*H02J 9/06* (2006.01)

(52) U.S. Cl.
CPC .................................. *H02J 9/062* (2013.01)

(58) Field of Classification Search
CPC ........ H02J 1/00; H02J 1/10; H02J 3/00; H02J 3/14; H02J 9/00; H02J 9/062;
(Continued)

(56) References Cited

U.S. PATENT DOCUMENTS

| | | | | |
|---|---|---|---|---|
| 2012/0086269 A1* | 4/2012 | Nakano | ................... | H02J 9/061 307/23 |
| 2015/0207362 A1* | 7/2015 | Ohnishi | ................... | H02J 9/062 307/65 |

FOREIGN PATENT DOCUMENTS

| | | |
|---|---|---|
| JP | 2004-56918 A | 2/2004 |
| JP | 2007-202241 A | 8/2007 |

(Continued)

OTHER PUBLICATIONS

International Search Report dated Oct. 6, 2015 in PCT/JP2015/070405 dated Jul. 16, 2015.

(Continued)

*Primary Examiner* — Lincoln D Donovan
*Assistant Examiner* — Dave Mattison
(74) *Attorney, Agent, or Firm* — Oblon, McClelland, Maier & Neustadt, L.L.P.

(57) ABSTRACT

An uninterruptible power supply device includes N UPS modules connected in parallel with one another between an AC power supply and a load, a current detector configured to detect a load current, and a controller configured to select n UPS modules, and an auxiliary UPS module, based on a result of detection by the current detector. Each of the n UPS modules is configured to supply, to the load, a shared current which is 1/n of the load current. The auxiliary UPS module is configured to output, to the load, a counter voltage having a value in accordance with output voltages of the n UPS modules, and thereby to stand by in a state where no current flows between the auxiliary UPS module and the n UPS modules and between the auxiliary UPS module and the load.

11 Claims, 5 Drawing Sheets

(58) Field of Classification Search
CPC ..... Y02B 70/00; Y02B 70/3225; Y02T 10/00;
Y02T 10/7005; Y02T 10/92
USPC .......................................................... 307/65
See application file for complete search history.

(56) References Cited

FOREIGN PATENT DOCUMENTS

| | | |
|---|---|---|
| JP | 2011-188706 A | 9/2011 |
| JP | 2014-53986 A | 3/2014 |
| WO | 2011/033820 A1 | 3/2011 |
| WO | 2014/016919 A1 | 1/2014 |

OTHER PUBLICATIONS

Office Action dated Jun. 12, 2018 in corresponding Japanese Patent Application No. 2017-528254 (with English Translation), 6 pages.
Japanese Office Action dated Jan. 15, 2019 in Patent Application No. 2017-528254 (with English translation), 8 pages.
Extended European Search Report dated Dec. 17, 2018 in Patent Application No. 15898310.6, 9 pages.

* cited by examiner

UNINTERRUPTIBLE POWER SUPPLY DEVICE

TECHNICAL FIELD

The present invention relates to an uninterruptible power supply device, and in particular to an uninterruptible power supply device including a plurality of uninterruptible power supply units connected in parallel with one another between an alternating current (AC) power supply and a load.

BACKGROUND ART

Japanese Patent Laying-Open No. 2011-188706 (PTD 1) discloses an uninterruptible power supply device including a plurality of uninterruptible power supply units connected in parallel with one another between an AC power supply and a load. In this uninterruptible power supply device, n (where n is a positive integer) uninterruptible power supply units required to supply a load current are selected from the plurality of uninterruptible power supply units, current is supplied from the selected n uninterruptible power supply units to the load, and operation of each remaining uninterruptible power supply unit is stopped. When the load current increases and cannot be shared by the n uninterruptible power supply units, another uninterruptible power supply unit is activated, and current is supplied from the (n+1) uninterruptible power supply units to the load.

CITATION LIST

Patent Document

PTD 1: Japanese Patent Laying-Open No. 2011-188706

SUMMARY OF INVENTION

Technical Problem

However, in a conventional uninterruptible power supply device, the uninterruptible power supply unit is activated after the load current increases, and thus the speed of response to a change in load is slow.

Further, when one of the n uninterruptible power supply units fails, it is conceivable to activate a normal uninterruptible power supply unit. Also in this case, when the uninterruptible power supply unit is activated after a failure occurs, the speed of response to the occurrence of the failure is slow.

Accordingly, a main object of the present invention is to provide an uninterruptible power supply device having a fast speed of response to a change in load and occurrence of a failure.

Solution to Problem

An uninterruptible power supply device in accordance with the present invention includes a plurality of uninterruptible power supply units connected in parallel with one another between an AC power supply and a load, a current detector configured to detect a load current, and a controller configured to select first to n-th uninterruptible power supply units required to supply the load current, and to select an (n+1)th uninterruptible power supply unit, from the plurality of uninterruptible power supply units, based on a result of detection by the current detector, n being a positive integer. Each of the first to n-th uninterruptible power supply units is configured to supply, to the load, a shared current which is 1/n of the load current. The (n+1)th uninterruptible power supply unit is configured to output, to the load, a counter voltage having a value in accordance with output voltages of the first to n-th uninterruptible power supply units, and thereby to stand by in a state where no current flows between the (n+1)th uninterruptible power supply unit and the first to n-th uninterruptible power supply units and between the (n+1)th uninterruptible power supply unit and the load.

Advantageous Effects of Invention

In the uninterruptible power supply device in accordance with the present invention, first to n-th uninterruptible power supply units required to supply the load current are selected and an (n+1)th uninterruptible power supply unit is selected, and the (n+1)th uninterruptible power supply unit is configured to output a counter voltage having a value in accordance with output voltages of the first to n-th uninterruptible power supply units, and thereby to stand by in a state where no current flows between the (n+1)th uninterruptible power supply unit and the first to n-th uninterruptible power supply units and between the (n+1)th uninterruptible power supply unit and the load. Therefore, when the load current increases, and when one of the first to n-th uninterruptible power supply units fails, the uninterruptible power supply device can quickly react to occurrence of a failure by increasing an output current of the (n+1)th uninterruptible power supply unit. Thus, an uninterruptible power supply device having a fast speed of response to a change in load and occurrence of a failure can be achieved.

DESCRIPTION OF EMBODIMENTS

First Embodiment

Figure 1:
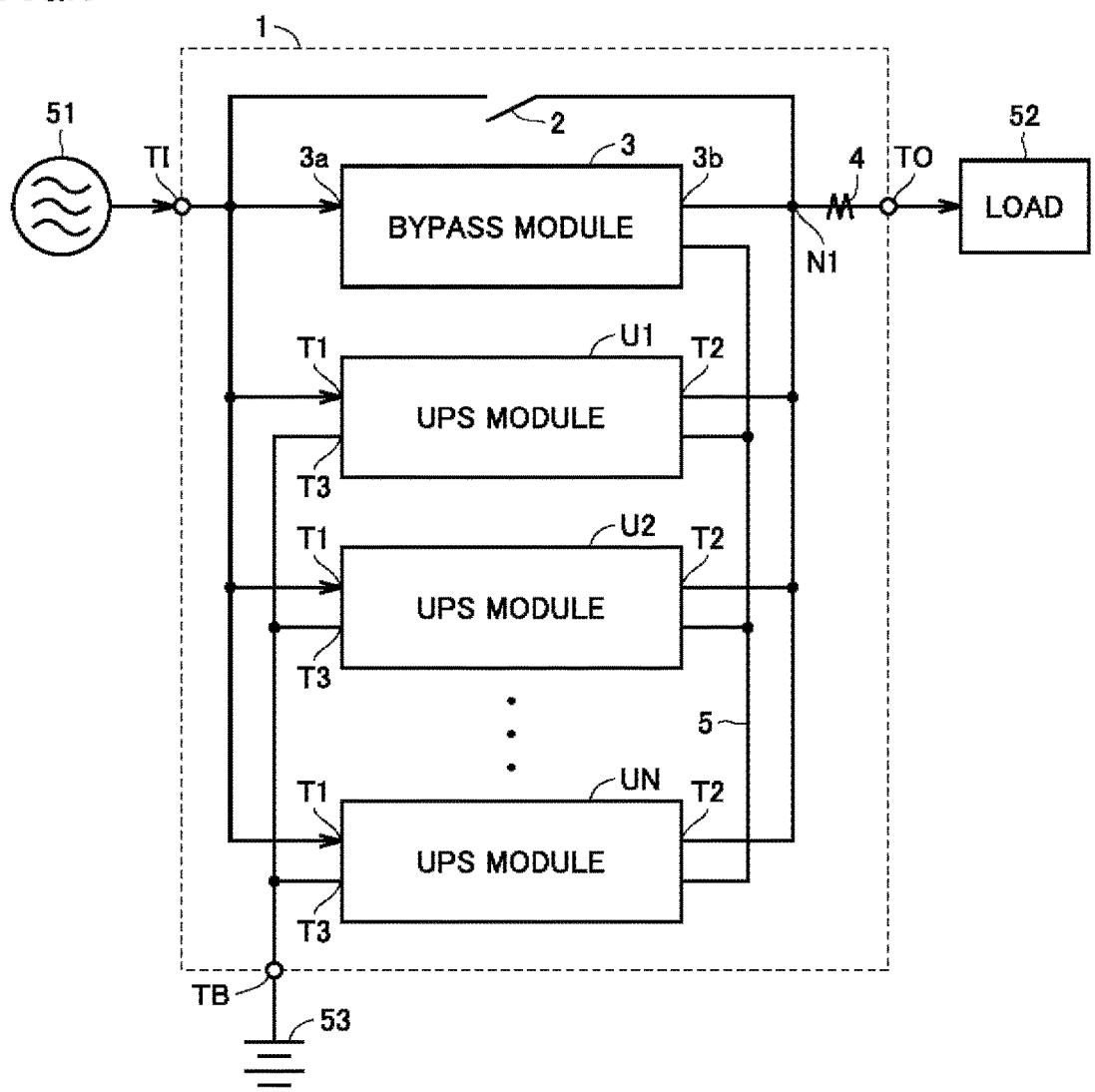
FIG. 1 is a circuit block diagram showing a configuration of an uninterruptible power supply device in accordance with a first embodiment of the present invention.

FIG. 1 is a circuit block diagram showing a configuration of an uninterruptible power supply device 1 in accordance with a first embodiment of the present invention. Although uninterruptible power supply device 1 is configured to receive three-phase AC power having a commercial frequency from a commercial AC power supply 51 and to supply the three-phase AC power having the commercial frequency to a load 52, FIG. 1 shows only a portion involved in one phase, for simplification of the drawing and the description.

In FIG. 1, uninterruptible power supply device 1 includes an input terminal TI, an output terminal TO, a battery terminal TB, a bypass switch 2, a bypass module 3, N UPS (uninterruptible power supply) modules (i.e., uninterruptible power supply units) U1 to UN, a current detector 4, and a communication line 5. N is an integer more than or equal to 2.

Input terminal TI receives the AC power supplied from commercial AC power supply 51. Output terminal TO is connected to load 52. Load 52 is driven by AC power supplied from uninterruptible power supply device 1. Battery terminal TB is connected to a battery 53 (i.e., a power storage device). Instead of battery 53, a capacitor may be connected. Battery 53 stores direct current (DC) power.

Bypass module 3 includes an input terminal 3a and an output terminal 3b. Each of UPS modules U1 to UN includes an input terminal T1, an output terminal T2, and a battery terminal T3. One terminal of bypass switch 2, input terminal 3a of bypass module 3, and input terminals T1 of UPS modules U1 to UN are all connected to input terminal TI.

The other terminal of bypass switch 2, output terminal 3b of bypass module 3, and output terminals T2 of UPS modules U1 to UN are all connected to a node N1, and node N1 is connected to output terminal TO. Battery terminals T3 of UPS modules U1 to UN are all connected to battery terminal TB.

Current detector 4 detects an instantaneous value of an alternating current (that is, a load current) flowing between node N1 and output terminal TO, and outputs a signal indicating the detected value. Bypass module 3 and UPS modules U1 to UN are coupled with one another by communication line 5. Each module transmits and receives various information and signals to and from other modules via communication line 5.

A controller within bypass module 3 selects n UPS modules U1 to Un required to supply a load current IL, and selects an auxiliary UPS module U(n+1), from N UPS modules U1 to UN, based on a result of detection by current detector 4. n is an integer which is more than or equal to 1 and less than or equal to N. In the case of n=N, an auxiliary UPS module is not selected.

Each of n selected UPS modules U1 to Un supplies, to load 52, a shared current Is which is 1/n of load current IL. Auxiliary UPS module U(n+1) outputs, to load 52, a counter voltage having a value in accordance with output voltages of UPS modules U1 to Un, and thereby stands by in a state where no current flows between UPS module U(n+1) and UPS modules U1 to Un and between UPS module U(n+1) and load 52. The counter voltage is adjusted to prevent outflow of current from UPS module U(n+1) to UPS modules U1 to Un and load 52, and to prevent inflow of current from UPS modules U1 to Un and load 52 to UPS module U(n+1).

When load current IL increases and shared current Is exceeds an upper limit value, auxiliary UPS module U(n+1) starts output of current to load 52, and load current IL is shared by (n+1) UPS modules U1 to U(n+1). Each of UPS modules U1 to U(n+1) supplies, to load 52, shared current Is which is 1/(n+1) of load current IL. Therefore, uninterruptible power supply device 1 can quickly react to an increase in load current IL.

When any one of UPS modules U1 to Un fails, auxiliary UPS module U(n+1) supplies, to load 52, shared current Is which is 1/n of load current IL, in place of the failed UPS module. When two or more of UPS modules U1 to Un fail, bypass switch 2 is turned on, and the AC power from commercial AC power supply 51 is supplied to load 52 via switch 2. Therefore, uninterruptible power supply device 1 can quickly react to occurrence of a failure.

The counter voltage will now be described. Although output voltages of UPS modules U1 to U(n+1) are AC voltages, the output voltages of UPS modules U1 to U(n+1) can be considered as DC voltages at a certain moment. In a period in which the output voltages of UPS modules U1 to U(n+1) are positive voltages, an equivalent circuit is conceivable in which the output voltages of UPS modules U1 to U(n+1) are provided to anodes of (n+1) diodes, and cathodes of the (n+1) diodes are all connected to load 52.

When the output voltage of UPS module U(n+1) is set to the same value as the value of the output voltages of UPS modules U1 to Un, the (n+1) diodes are all turned on, and current flows from UPS modules U1 to U(n+1) to load 52 via the (n+1) diodes. When the output voltage of UPS module U(n+1) is gradually decreased, a diode corresponding to UPS module U(n+1) is turned off. Thus, although current flows from UPS modules U1 to Un to load 52, no current flows from UPS module U(n+1) to load 52. The voltage at which the diode corresponding to UPS module U(n+1) is turned off corresponds to the counter voltage.

When the output voltage of UPS module U(n+1) is increased to be higher than the counter voltage and the diode corresponding to UPS module U(n+1) is turned on again, current flows from UPS modules U1 to U(n+1) to load 52. Therefore, if UPS module U(n+1) stands by with the output voltage thereof being maintained at the counter voltage, supply of current from UPS module U(n+1) to load 52 can be quickly started by increasing the output voltage of UPS module U(n+1).

Similarly, in a period in which the output voltages of UPS modules U1 to U(n+1) are negative voltages, an equivalent circuit is conceivable in which the output voltages of UPS modules U1 to U(n+1) are provided to cathodes of (n+1) diodes, and anodes of the (n+1) diodes are all connected to load 52.

When the output voltage of UPS module U(n+1) is set to the same value as the value of the output voltages of UPS modules U1 to Un, the (n+1) diodes are all turned on, and current flows from load 52 to UPS modules U1 to U(n+1) via the (n+1) diodes. When the output voltage of UPS module U(n+1) is gradually increased, a diode corresponding to UPS module U(n+1) is turned off. Thus, although current flows from load 52 to UPS modules U1 to Un, no current flows from load 52 to UPS module U(n+1). The voltage at which the diode corresponding to UPS module U(n+1) is turned off corresponds to the counter voltage.

When the output voltage of UPS module U(n+1) is decreased to be lower than the counter voltage and the diode corresponding to UPS module U(n+1) is turned on again, current flows from load 52 to UPS modules U1 to U(n+1). Therefore, if UPS module U(n+1) stands by with the output voltage thereof being maintained at the counter voltage, supply of negative current from UPS module U(n+1) to load 52 can be quickly started by decreasing the output voltage of UPS module U(n+1). The configuration and operation of uninterruptible power supply device 1 will be described in detail below.

Figure 2:
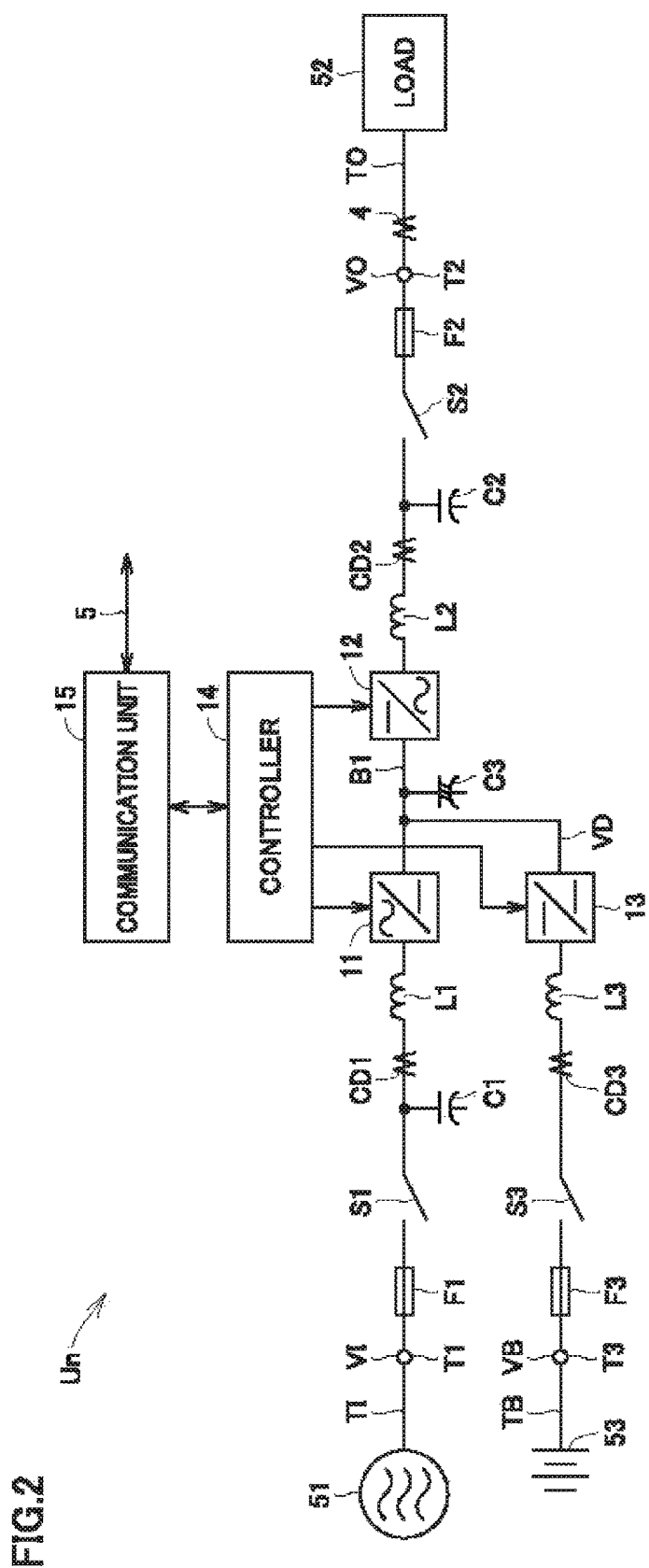
FIG. 2 is a circuit block diagram showing a configuration of a UPS module shown in FIG. 1.

FIG. 2 is a circuit block diagram showing a configuration of a UPS module Un. Although UPS module Un is configured to receive and output three-phase AC power, FIG. 2 shows only a portion involved in one-phase AC power, for simplification of the drawing and the description. In FIG. 2, UPS module Un includes input terminal T1, output terminal T2, battery terminal T3, fuses F1 to F3, switches S1 to S3, capacitors C1 to C3, reactors L1 to L3, a converter 11, a DC bus B1, an inverter 12, a bidirectional chopper 13, current detectors CD1 to CD3, a controller 14, and a communication unit 15. Input terminal T1, output terminal T2, and battery terminal T3 are as described in FIG. 1.

Switch S1 has one terminal connected to input terminal T1 via fuse F1, and the other terminal connected to an input node of converter 11 via reactor L1. Capacitor C1 is connected to the other terminal of switch S1. An output node of converter 11 is connected to an input node of inverter 12 via DC bus B1, and is connected to one input/output node of bidirectional chopper 13. Capacitor C3 is connected to DC bus B1. DC buses B1 of UPS modules U1 to UN are connected with one another.

An output node of inverter 12 is connected to one terminal of switch S2 via reactor L2, and the other terminal of switch S2 is connected to output terminal T2 via fuse F2. Capacitor C2 is connected to the one terminal of switch S2. Switch S3 has one terminal connected to battery terminal T3 via fuse F3, and the other terminal connected to the other input/output node of bidirectional chopper 13 via reactor L3.

Fuse F1 is blown when overcurrent flows, to protect converter 11 and the like. Switch S1 is controlled by controller 14. Switch S1 is ON in a normal state where the AC power is supplied from commercial AC power supply 51, and is turned off in a power failure state where supply of the AC power from commercial AC power supply 51 is stopped.

Capacitor C1 and reactor L1 constitute an AC filter. The AC filter is a low-pass filter, which passes the AC power having the commercial frequency supplied from commercial AC power supply 51, and blocks a signal having a switching frequency generated in converter 11.

Converter 11 is controlled by controller 14. In the normal state where the AC power is supplied from commercial AC power supply 51, converter 11 converts the AC power from commercial AC power supply 51 into DC power, and provides the DC power to inverter 12 and bidirectional chopper 13 via DC bus B1. Converter 11 outputs a direct current to DC bus B1 such that a DC voltage VD of DC bus B1 matches a target DC voltage VDT. In the power failure state where supply of the AC power from commercial AC power supply 51 is stopped, operation of converter 11 is stopped. Capacitor C3 smoothes and stabilizes DC voltage VD of DC bus B1.

Fuse F3 is blown when overcurrent flows, to protect battery 53, bidirectional chopper 13, and the like. Switch S3 is normally ON, and is turned off, for example, during maintenance of battery 53. Reactor L3 is a low-pass filter, which passes the DC power, and blocks a signal having a switching frequency generated in bidirectional chopper 13.

Bidirectional chopper 13 is controlled by controller 14. Bidirectional chopper 13 stores the DC power generated by converter 11 in battery 53 in the normal state, and supplies the DC power in battery 53 to inverter 12 in the power failure state. In the normal state, bidirectional chopper 13 supplies a direct current to battery 53 such that a voltage VB between terminals of battery 53 matches a target DC voltage VBT. In the power failure state, bidirectional chopper 13 outputs a direct current to DC bus B1 such that DC voltage VD of DC bus B1 matches target DC voltage VDT.

Inverter 12 is controlled by controller 14. When corresponding UPS module Un is selected as a UPS module required to supply load current IL, inverter 12 outputs shared current Is to load 52. On this occasion, inverter 12 converts the DC power generated by converter 11 into AC power having the commercial frequency and supplies it to load 52 in the normal state, and converts the DC power supplied from battery 53 via bidirectional chopper 13 into AC power having the commercial frequency and supplies it to load 52 in the power failure state.

When corresponding UPS module Un is selected as an auxiliary UPS module, inverter 12 outputs the counter voltage which counters the output voltages of other UPS modules, and is set to a standby state in which no current flows between UPS module Un and other UPS modules and between UPS module Un and load 52. In other words, inverter 12 outputs the counter voltage and outputs 0 A on this occasion.

Reactor L2 and capacitor C2 constitute an AC filter. The AC filter is a low-pass filter, which passes the AC power having the commercial frequency generated by inverter 12, and blocks a signal having a switching frequency generated in inverter 12. In other words, the AC filter shapes the waveform of an output voltage of inverter 12 into a sinusoidal wave.

Switch S2 is controlled by controller 14. Switch S2 is turned on when corresponding UPS module Un is selected as a UPS module required to supply load current IL. Further, switch S2 is turned on when corresponding UPS module Un is selected as an auxiliary UPS module. Otherwise, switch S2 is turned off. When switch S2 is turned off, UPS module Un is set to a high impedance state with respect to load 52. Switches S2 of UPS modules U1 to UN constitute a switching circuit configured to connect selected (n+1) UPS modules U1 to U(n+1), of N UPS modules U1 to UN, to load 52 in parallel with one another, and to electrically separate each remaining UPS module from load 52.

An AC voltage VI of input terminal T1 (that is, an AC voltage supplied from commercial AC power supply 51), an AC voltage VO of output terminal T2 (that is, an output voltage), DC voltage VB of battery terminal T3 (that is, the voltage between terminals of battery 53), and DC voltage VD of DC bus B1 are provided to controller 14.

Current detector CD1 detects an instantaneous value of an alternating current flowing into reactor L1 (that is, an input current of converter 11), and provides controller 14 with a signal indicating the detected value. Current detector CD2 detects an instantaneous value of an alternating current flowing into reactor L2 (that is, an output current of inverter 12), and provides controller 14 with a signal indicating the detected value. Current detector CD3 detects an instantaneous value of a direct current flowing into reactor L3 (that is, a direct current flowing into battery 53), and provides controller 14 with a signal indicating the detected value.

Communication unit 15 is provided between controller 14 and communication line 5 to transmit and receive various information and signals to and from bypass module 3 and other UPS modules.

Controller 14 determines whether or not inverter 12 is normal, and when controller 14 determines that inverter 12 has a failure, controller 14 outputs a failure detection signal to bypass module 3 via communication unit 15 and communication line 5.

Controller 14 controls converter 11, inverter 12, and bidirectional chopper 13, based on instantaneous values of AC voltages VI and VO, instantaneous values of DC voltages VB and VD, the detected values of current detectors CD1 to CD3, and the information and signals (such as a current command value, an operation command signal, a stop command signal, and the like) supplied from bypass module 3 via communication line 5 and communication unit 15.

In particular, controller 14 controls converter 11 based on the instantaneous value of AC voltage VI of input terminal T1, the instantaneous value of DC voltage VD of DC bus B1, the detected value of current detector CD1, the current command value from bypass module 3, and the like. Thereby, DC voltage VD of DC bus B1 is maintained at target DC voltage VDT.

Controller 14 controls bidirectional chopper 13 based on the instantaneous value of AC voltage VI of input terminal T1, the instantaneous value of DC voltage VD of DC bus B1, the instantaneous value of DC voltage VB of battery terminal T3, the output signal of current detector CD3, the current command value from bypass module 3, and the like. Thereby, voltage VB between terminals of battery 53 is maintained at target DC voltage VBT.

Controller 14 controls inverter 12 based on the instantaneous value of AC voltage VI of input terminal T1, the instantaneous value of AC voltage VO of output terminal T2, the output signal of current detector CD2, the current command value from bypass module 3, and the like. Thereby, the output current of inverter 12 is maintained at shared current Is or 0 A.

Figure 3:
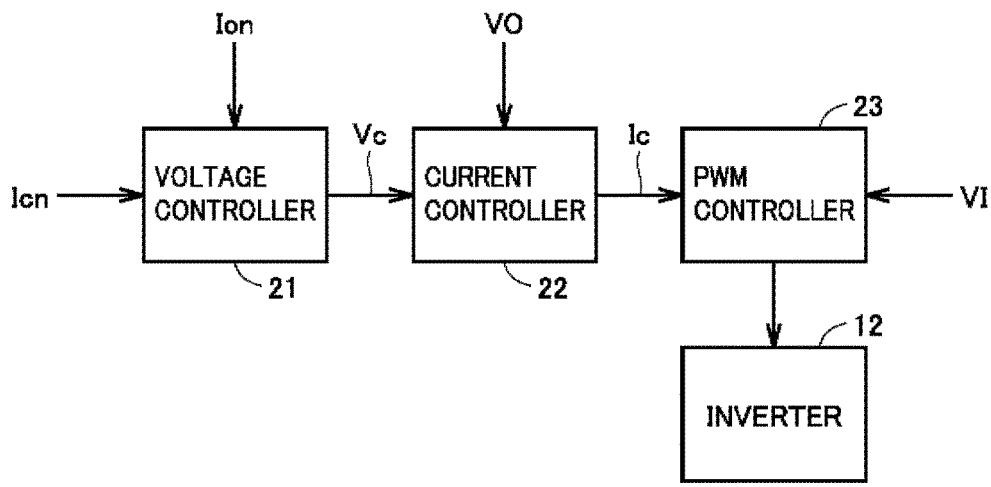
FIG. 3 is a block diagram showing a configuration of a portion of a controller shown in FIG. 2 involved in control of an inverter.

FIG. 3 is a block diagram showing a configuration of a portion of controller 14 involved in control of inverter 12. In FIG. 3, controller 14 includes a voltage controller 21, a current controller 22, and a PWM (pulse width modulation) controller 23.

Voltage controller 21 determines a deviation between a current command value Icn from bypass module 3 and a detected value Ion of current detector CD2 (an output current of UPS module Un), and generates a voltage command value Vc to eliminate the deviation. Current controller 22 determines a deviation between output voltage VO and voltage command value Vc, and generates a current command value Ic to eliminate the deviation. PWM controller 23 generates a PWM signal according to current command value Ic in synchronization with AC voltage VI of input terminal T1, and controls inverter 12 using the PWM signal.

Current command value Icn from bypass module 3 is set to a value in accordance with shared current Is when corresponding UPS module Un is selected as a UPS module required to supply load current IL, and is set to a value in accordance with 0 A when corresponding UPS module Un is selected as an auxiliary UPS module.

In other words, when corresponding UPS module Un is selected as a UPS module required to supply load current IL, inverter 12 outputs shared current Is. When corresponding UPS module Un is selected as an auxiliary UPS module, inverter 12 outputs the counter voltage having a value in accordance with output voltages VO of other UPS modules and outputs 0 A, and is set to the standby state in which no current flows between UPS module Un and other UPS modules and between UPS module Un and load 52. Since inverter 12 is already activated and set to the standby state, the output current of inverter 12 increases quickly and smoothly when current command value Icn is increased.

Figure 4:
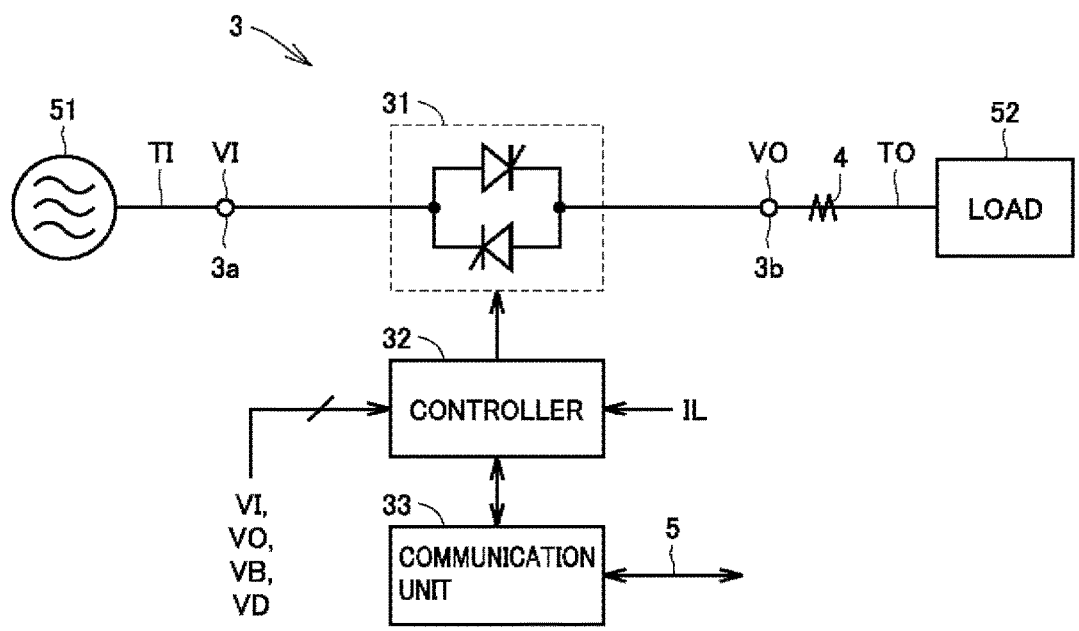
FIG. 4 is a circuit block diagram showing a configuration of a bypass module shown in FIG. 1.

FIG. 4 is a circuit block diagram showing a configuration of bypass module 3. Although bypass module 3 is configured to receive and output three-phase AC power, FIG. 4 shows only a portion involved in one-phase AC power, for simplification of the drawing and the description. In FIG. 3, bypass module 3 includes input terminal 3a, output terminal 3b, a semiconductor switch 31, a controller 32, and a communication unit 33.

Semiconductor switch 31 is connected between input terminal 3a and output terminal 3b, and is set to an ON state or an OFF state by controller 32. Semiconductor switch 31 includes, for example, two thyristors connected in anti-parallel with each other. Semiconductor switch 31 may be constituted of other semiconductor elements such as transistors. Communication unit 33 is connected between controller 32 and communication line 5 to transmit and receive various information and signals between controller 32 and UPS modules U1 to UN.

Controller 32 controls UPS modules U1 to UN, semiconductor switch 31, and bypass switch 2, based on an instantaneous value of AC voltage VI of input terminal 3a (the AC voltage supplied from commercial AC power supply 51), an instantaneous value of AC voltage VO of output terminal 3b (the output voltages of UPS modules U1 to UN), an instantaneous value of DC voltage VB of battery terminal TB (the voltage between terminals of battery 53), DC voltage VD of DC bus B1, the detected value of current detector 4 (that is, load current IL), failure detection signals from UPS modules U1 to UN, and the like.

In particular, controller 32 determines whether or not the AC power is normally supplied from commercial AC power supply 51 (that is, whether or not a power failure occurs) based on the instantaneous value of input voltage VI, and transmits a signal indicating a determination result to controllers 14 of UPS modules U1 to UN via communication unit 33.

In a UPS module selected as being required to supply load current IL, in the normal state where no power failure occurs, the AC power from commercial AC power supply 51 is converted into DC power by converter 11, and the DC power is stored in battery 53 via bidirectional chopper 13, and is converted into AC power by inverter 12 and supplied to load 52.

When a power failure occurs, operation of converter 11 is stopped, and the DC power in battery 53 is supplied to inverter 12 via bidirectional chopper 13, converted into AC power by inverter 12, and supplied to load 52. Therefore, operation of load 52 is continued for a period in which the DC power is stored in battery 53.

Controller 32 determines a deviation between a target output voltage VOT and output voltage VO, generates a current command value Ico to eliminate the deviation, and transmits current command value Ico to controllers 14 of UPS modules U1 to UN via communication unit 33. Current command value Ico is added to current command value Icn described above and used to control inverter 12.

Controller 32 determines a deviation between target DC voltage VDT and DC voltage VD, generates a current command value Icd to eliminate the deviation, and transmits current command value Icd to controllers 14 of UPS modules U1 to UN via communication unit 33. Current command value Icd is used to control converter 11 and bidirectional chopper 13.

Controller 32 determines a deviation between target DC voltage VBT and DC voltage VB, generates a current command value Icb to eliminate the deviation, and transmits current command value Icb to controllers 14 of UPS modules U1 to UN via communication unit 33. Current command value Icb is used to control bidirectional chopper 13.

Further, controller 32 selects n UPS modules U1 to Un required to supply load current IL, and selects auxiliary UPS module U(n+1), from UPS modules U1 to UN, based on the detected value of current detector 4 (that is, load current IL). Controller 32 outputs the operation command signal to controllers 14 of UPS modules U1 to U(n+1), and outputs the stop command signal to controllers 14 of remaining UPS modules U(n+2) to UN, via communication unit 33. Thereby, UPS modules U1 to U(n+1) are operated, and operation of UPS modules U(n+2) to UN is stopped.

Controller 32 determines shared current Is of each of UPS modules U1 to Un by dividing load current IL by n, generates current command values Ic1 to Icn each having a value in accordance with shared current Is, and transmits generated current command values Ic1 to Icn to controllers 14 of UPS modules U1 to Un, respectively, via communication unit 33. Controller 32 generates a current command value Ic(n+1) having a value in accordance with 0 A, and outputs current command value Ic(n+1) to controller 14 of auxiliary UPS module U(n+1) via communication unit 33.

When load current IL is increased and thus the number of UPS modules required to supply load current IL is increased by 1 and becomes (n+1), controller 32 selects (n+1) UPS modules U1 to U(n+1) and selects an auxiliary UPS module U(n+2). Controller 32 also outputs the operation command signal to controller 14 of UPS module U(n+2), in addition to controllers 14 of UPS modules U1 to U(n+1), via communication unit 33.

Controller 32 determines new shared current Is of each of UPS modules U1 to U(n+1) by dividing increased load current IL by (n+1), generates current command values Ic1 to Ic(n+1) each having a value in accordance with shared current Is, and transmits generated current command values Ic1 to Ic(n+1) to controllers 14 of UPS modules U1 to U(n+1), respectively, via communication unit 33. Controller 32 generates a current command value Ic(n+2) having a value in accordance with 0 A, and outputs current command value Ic(n+2) to controller 14 of auxiliary UPS module U(n+2) via communication unit 33. Thereby, increased load current IL is shared by (n+1) UPS modules U1 to U(n+1), and one UPS module U(n+2) is set to the standby state.

When controller 32 receives a failure detection signal from one of UPS modules U1 to Un under operation, controller 32 increases current command value Ic(n+1) to the value in accordance with shared current Is, and transmits current command value Ic(n+1) to controller 14 of UPS module U(n+1) via communication unit 33. Thereby, load current IL is shared by n UPS modules. Also in this case, one UPS module U(n+2) is newly set to the standby state.

When controller 32 receives failure detection signals from two or more of UPS modules U1 to Un under operation, load current IL cannot be shared by UPS modules U1 to U(n+1), and thus controller 32 turns on semiconductor switch 31 and bypass switch 2 and then turns off semiconductor switch 31 after a predetermined time. Thereby, the AC power from commercial AC power supply 51 is instantaneously supplied to load 52, and operation of load 52 is continued. The reason why semiconductor switch 31 is turned off after the predetermined time is to prevent semiconductor switch 31 from being overheated and damaged.

Figure 5:
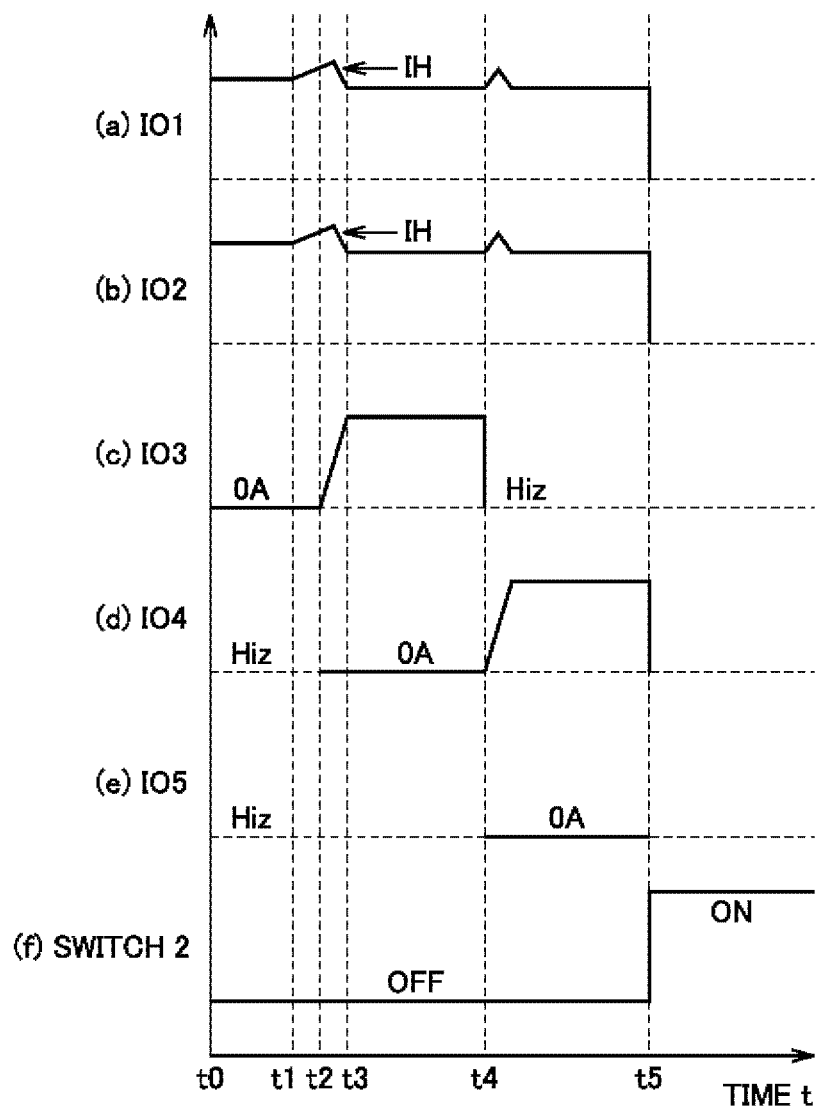
FIG. 5 is a time chart illustrating operation of the uninterruptible power supply device shown in FIG. 1.

FIGS. 5(a) to (f) show a time chart illustrating operation of uninterruptible power supply device 1. It is assumed here that N=5 and each of UPS modules U1 to U5 has a rated current of 100 A. FIGS. 5(a) to (e) show output currents IO1 to IO5 of UPS modules U1 to U5, respectively, and FIG. 5(f) shows ON/OFF states of bypass switch 2.

It is assumed that load current IL is 180 A in an initial state. At least two UPS modules are required to supply 180 A. Accordingly, controller 32 of bypass module 3 selects two UPS modules U1 and U2 required to supply load current IL, and selects auxiliary UPS module U3.

Controller 32 transmits the operation command signal to each of UPS modules U1 to U3, and transmits the stop command signal to each of remaining UPS modules U4 and U5. Thereby, UPS modules U1 to U3 are operated, and operation of UPS modules U4 and U5 is stopped. In UPS modules U1 to U3, inverter 12 is operated and switch S2 is turned on. In UPS modules U4 and U5, operation of inverter 12 is stopped and switch S2 is turned off.

Controller 32 determines shared current Is=90 A by dividing load current IL=180 A by n=2, generates current command values Ic1 and Ic2 each having a value in accordance with shared current Is, and transmits current command values Ic1 and Ic2 to UPS modules U1 and U2, respectively. Controller 32 further generates a current command value Ic3 having a value in accordance with 0 A, and provides current command value Ic3 to auxiliary UPS module U3.

Accordingly, at time point t0, output currents IO1 and IO2 of UPS modules U1 and U2 are both set to 90 A, output current IO3 of UPS module U3 is set to 0 A, and UPS modules U4 and U5 are both set to the high impedance state (HiZ). Namely, UPS module U3 outputs a counter voltage which counters output voltages VO of UPS modules U1 and U2, and is set to the standby state in which no current flows between UPS module U3 and UPS modules U1 and U2, and between UPS module U3 and load 52.

Next, it is assumed that, at time point t1, load current IL increases from 180 A toward 240 A. When output currents IO1 and IO2 of UPS modules U1 and U2 increase accordingly and each of IO1 and IO2 exceeds an upper limit value IH=100 A at time point t2, controller 32 determines shared current Is by dividing load current IL by n=3, generates current command values Ic1 to Ic3 each having a value in accordance with shared current Is, and transmits current command values Ic1 to Ic3 to UPS modules U1 to U3, respectively. Upper limit value IH may be the same value as the rated current of each of UPS modules U1 to U5, may be a value slightly higher than the rated current, or may be a value slightly lower than the rated current.

When load current IL reaches 240 A at time point t3, shared current Is is set to 240/3=80 A, and output currents IO1 to IO3 of UPS modules U1 to U3 are each set to 80 A.

Further, controller 32 selects auxiliary UPS module U4, transmits the operation command signal to UPS module U4, and generates a current command value Ic4 having a value in accordance with 0 A and outputs current command value Ic4 to UPS module U4. Thereby, in UPS module U4, inverter 12 is operated, switch S2 is turned on, output current IO4 of UPS module U4 is set to 0 A, and UPS module U4 is set to the standby state.

Next, it is assumed that, at time point t4, inverter 12 of UPS module U3 fails. In this case, switch S2 of UPS module U3 is turned off, and UPS module U3 is set to the high impedance state. Controller 14 of UPS module U3 transmits a failure detection signal φF3 to controller 32 of bypass module 3. Controller 32 of bypass module 3 transmits current command value Ic4 having a value in accordance with shared current Is=80 A to UPS module U4. Thereby, output current IO4 of UPS module U4 increases from 0 A to 80 A, and load current IL=240 A is shared by UPS modules U1, U2, and U4.

Further, controller 32 selects auxiliary UPS module U5, transmits the operation command signal to UPS module U5, and generates a current command value Ic5 having a value in accordance with 0 A and outputs current command value Ic5 to UPS module U5. Thereby, in UPS module U5, inverter 12 is operated, switch S2 is turned on, output current IO5 of UPS module U5 is set to 0 A, and UPS module U5 is set to the standby state.

Next, it is assumed that, at time point t5, inverters 12 of UPS modules U1 and U2 fail. In this case, switches S2 of UPS modules U1 and U2 are turned off, and UPS modules U1 and U2 are set to the high impedance state. Controllers 14 of UPS modules U1 and U2 transmit failure detection signals φF1 and φF2 to controller 32 of bypass module 3.

Controller 32 of bypass module 3 transmits an operation stop command signal to all UPS modules U1 to U5, and turns on semiconductor switch 31 and bypass switch 2 and then turns off semiconductor switch 31 after a predetermined time. Thereby, UPS modules U1 to U5 are all set to the high impedance state, and load current IL=240 A is supplied from commercial AC power supply 51 to load 52 via bypass switch 2.

It should be noted that, when load current IL decreases from 180 A to 90 A at time point t1, output current IO1 of UPS module U1 is set to 90 A, UPS module U2 is set to the standby state, and UPS module U3 is set to the high impedance state.

In the first embodiment, load current IL is shared by n UPS modules U1 to Un and auxiliary UPS module U(n+1) is set to the standby state, and when load current IL increases, load current IL is shared by (n+1) UPS modules U1 to U(n+1) by increasing output current IO of auxiliary UPS module U(n+1). Therefore, uninterruptible power supply device 1 which can react quickly even when load current IL increases, and has a fast speed of response to a change in load can be achieved.

When any one of UPS modules U1 to Un under operation fails, UPS module U(n+1) in the standby state outputs shared current Is in place of the failed UPS module. Therefore, uninterruptible power supply device 1 can also quickly react to a failure in a UPS module.

When two or more UPS modules U1 to Un under operation fail, bypass switch 2 is turned on, and the AC power from commercial AC power supply 51 is supplied to load 52. Therefore, even in such a case, operation of load 52 can be continued.

It should be noted that, although UPS modules U1 to U(n+1) are selected from UPS modules U1 to UN in the first embodiment, the present invention is not limited thereto, and it is needless to say that any (n+1) UPS modules may be selected from UPS modules U1 to UN. For example, when three UPS modules are selected, not only U1 to U3 may be selected, but also U1, U3, and U5 may be selected.

Second Embodiment

In the first embodiment, when load current IL has no change and no UPS module fails, the relation between UPS modules U1 to Un which output shared current Is and auxiliary UPS module U(n+1) is fixed. In this case, the burden on UPS modules U1 to Un may become larger than that on UPS module U(n+1), and the life of UPS modules U1 to Un may become shorter than that of UPS module U(n+1). The second embodiment provides a solution to this problem.

In the second embodiment, when controller 32 of bypass module 3 causes each of UPS modules U1 to Un to output shared current Is and sets UPS module U(n+1) to the standby state, controller 32 sequentially selects UPS module U1 to U(n+1) one by one with a predetermined cycle. Controller 32 includes, for example, a timer for detecting the predetermined cycle.

Controller 32 gradually decreases the current command value for a selected UPS module to set the output current of the UPS module to 0 A, and gradually increases the current command value for the UPS module in the standby state to set the output current of the UPS module to shared current Is. Therefore, UPS modules U1 to U(n+1) can be sequentially set to the standby state for each predetermined time, and the burden on (that is, the life of) UPS modules U1 to U(n+1) can be equalized.

Figure 6:
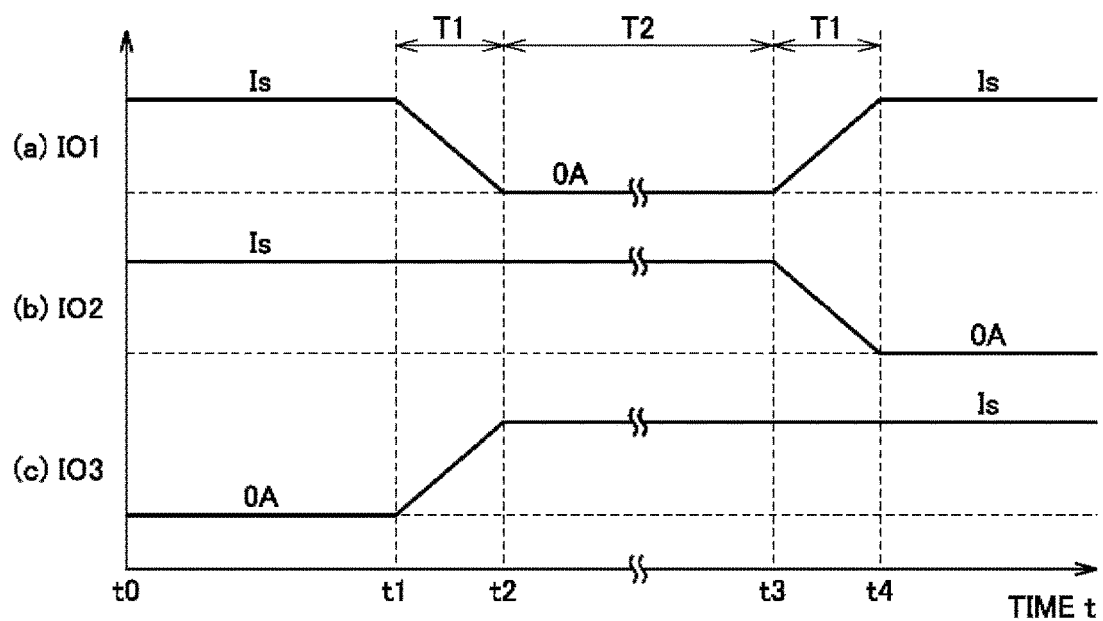
FIG. 6 is a time chart illustrating operation of an uninterruptible power supply device in accordance with a second embodiment of the present invention.

FIGS. 6(a) to (c) show a time chart illustrating operation of this uninterruptible power supply device. FIGS. 6(a) to (c) show output currents IO1 to IO3 of UPS modules U1 to U3, respectively. It is assumed here that each UPS module has a rated current of 100 A, load current IL is 180 A, two UPS modules each output shared current Is=90 A, and one auxiliary UPS module is set to the standby state and outputs 0 A.

It is assumed that, at time point t0, UPS modules U1 and U2 each output shared current Is=90 A, and UPS module U3 outputs 0 A. Controller 32 of bypass module 3 sequentially selects UPS modules U1 to U3 one by one with a predetermined cycle (T1+T2).

At time point t1, controller 32 selects UPS module U1. Controller 32 gradually decreases current command value Ic1 for selected UPS module U1 over a predetermined time T1 (from time point t1 to time point t2) to set output current IO1 of UPS module U1 to 0 A, and gradually increases current command value Ic3 for UPS module U3 in the standby state to set output current IO3 of UPS module U3 to shared current Is=90 A. During this period, the sum of IO1 and IO3 is always maintained at shared current Is=90 A.

At time point t3 at which a predetermined time T2 has elapsed since time point t2, controller 32 selects UPS module U2. Controller 32 gradually decreases current command value Ic2 for selected UPS module U2 over predetermined time T1 (from time point t3 to time point t4) to set output current IO2 of UPS module U2 to 0 A, and gradually increases current command value Ic1 for UPS module U1 in the standby state to set output current IO1 of UPS module U1 to shared current Is=90 A. During this period, the sum of IO1 and IO2 is always maintained at shared current Is=90 A.

In the second embodiment, UPS modules U1 to U(n+1) are sequentially selected one by one with the predetermined cycle, the selected UPS module is set to the standby state, and load current IL is shared by other n UPS modules. Therefore, the burden on (that is, the life of) UPS modules U1 to U(n+1) can be equalized.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

1: uninterruptible power supply device; TI, T1: input terminal; TO, T2: output terminal; TB, T3: battery terminal; 2: bypass switch; 3: bypass module; U1 to UN: UPS module; 4, CD1 to CD3: current detector; 5: communication line; S1 to S3: switch; C1 to C3: capacitor; L1 to L3: reactor; 11: converter; B1: DC bus; 12: inverter; 13: bidirectional chopper; 14, 32: controller; 15, 33: communication unit; 21: voltage controller; 22: current controller; 23: PWM controller; 31: semiconductor switch; 51: commercial AC power supply; 52: load; 53: battery.

The invention claimed is:
1. An uninterruptible power supply device comprising:
a plurality of uninterruptible power supply units connected in parallel with one another between an AC power supply and a load;
a current detector configured to detect a load current; and a controller configured to select first to n-th uninterruptible power supply units required to supply the load current, and to select an (n+1)th uninterruptible power supply unit, from the plurality of uninterruptible power supply units, based on a result of detection by the current detector, n being a positive integer, each of the plurality of uninterruptible power supply units comprising:
an inverter configured to perform power conversion between the AC power supply and the load; and
a switch configured to switch an electrical connection state between the inverter and the load, each of the first to n-th uninterruptible power supply units being configured to operate the inverter in a state in which the inverter is electrically connected to the load by the switch to supply, to the load, a shared current which is 1/n of the load current, the (n+1)th uninterruptible power supply unit being configured to continue to operate the inverter in a state in which the inverter is electrically connected to the load by the switch to output, to the load, a counter voltage having a value in accordance with output voltages of the first to n-th uninterruptible power supply units, and thereby to stand by in a state where no current flows between the (n+1)th uninterruptible power supply unit and the first to n-th uninterruptible power supply units and between the (n+1)th uninterruptible power supply unit and the load, each of the remaining uninterruptible power supply units other than the first to (n+1)th uninterruptible power supply units among the plurality of uninterruptible power supply units being configured to stop the inverter in a state in which the inverter is electrically disconnected to the load by the switch, and thereby to stand by in a state where no current flows between the remaining uninterruptible power supply unit and the first to (n+1)th uninterruptible power supply units and between the remaining uninterruptible power supply unit and the load.

2. The uninterruptible power supply device according to claim 1, wherein, when the load current increases and the shared current exceeds a predetermined upper limit value, the (n+1)th uninterruptible power supply unit is configured to start output of current to the load, and each of the first to (n+1)th uninterruptible power supply units is configured to supply, to the load, a shared current which is 1/(n+1) of the load current.

3. The uninterruptible power supply device according to claim 2, wherein
the controller is further configured to select an (n+2)th uninterruptible power supply unit from the plurality of uninterruptible power supply units, and
the (n+2)th uninterruptible power supply unit is configured to output, to the load, a counter voltage having a value in accordance with output voltages of the first to (n+1)th uninterruptible power supply units, and thereby to stand by in a state where no current flows between the (n+2)th uninterruptible power supply unit and the first to (n+1)th uninterruptible power supply units and between the (n+2)th uninterruptible power supply unit and the load.

4. The uninterruptible power supply device according to claim 1, wherein, when any one of the first to n-th uninterruptible power supply units fails, the (n+1)th uninterruptible power supply unit is configured to supply, to the load, the shared current which is 1/n of the load current, in place of the failed uninterruptible power supply unit.

5. The uninterruptible power supply device according to claim 4, wherein
the controller is further configured to select an (n+2)th uninterruptible power supply unit from the plurality of uninterruptible power supply units, and
the (n+2)th uninterruptible power supply unit is configured to output, to the load, a counter voltage having a value in accordance with output voltages of n uninterruptible power supply units under operation, and thereby to stand by in a state where no current flows between the (n+2)th uninterruptible power supply unit and the n uninterruptible power supply units under operation and between the (n+2)th uninterruptible power supply unit and the load.

6. The uninterruptible power supply device according to claim 4, further comprising a bypass switch connected between the AC power supply and the load and configured to be turned on when two or more of the first to n-th uninterruptible power supply units fail.

7. The uninterruptible power supply device according to claim 1, wherein
the controller is configured to sequentially select the first to (n+1)th uninterruptible power supply units one by one with a predetermined cycle,
a selected uninterruptible power supply unit, of the first to (n+1)th uninterruptible power supply units, is configured to output, to the load, a counter voltage having a value in accordance with output voltages of unselected n uninterruptible power supply units, and thereby to stand by in a state where no current flows between the selected uninterruptible power supply unit and the n uninterruptible power supply units and between the selected uninterruptible power supply unit and the load, and
the n uninterruptible power supply units are each configured to supply, to the load, the shared current which is 1/n of the load current.

8. The uninterruptible power supply device according to claim 1, wherein
each of the plurality of uninterruptible power supply units includes
a converter configured to convert AC power supplied from the AC power supply into DC power, and
an inverter configured to convert the DC power into AC power and to supply the AC power to the load,
in a normal state where the AC power is supplied from the AC power supply, the DC power generated by the converter is supplied to the inverter and stored in a power storage device, and
in a power failure state where supply of the AC power from the AC power supply is stopped, the DC power in the power storage device is supplied to the inverter.

9. The uninterruptible power supply device according to claim 8, wherein
the inverter included in each of the first to n-th uninterruptible power supply units is configured to supply, to the load, the shared current which is 1/n of the load current, and
the inverter included in the (n+1)th uninterruptible power supply unit is configured to output, to the load, a counter voltage having a value in accordance with output voltages of the inverter of each of the first to n-th uninterruptible power supply units, and thereby to stand by in a state where no current flows between the inverter of the (n+1)th uninterruptible power supply unit and the inverter of each of the first to n-th uninterruptible power supply units and between the inverter of the (n+1)th uninterruptible power supply unit and the load.

10. The uninterruptible power supply device according to claim 1, wherein
the controller is configured to generate first to (n+1)th current command values and to provide the first to (n+1)th current command values to the first to (n+1)th uninterruptible power supply units, respectively,
the first to n-th current command values are each a value in accordance with the shared current which is 1/n of the load current, and the (n+1)th current command value is a value in accordance with 0 A, and
the first to (n+1)th uninterruptible power supply units are configured to output, to the load, currents having values according to the first to (n+1)th current command values, respectively.

11. The uninterruptible power supply device according to claim 1, further comprising a switching circuit configured to connect the first to (n+1)th uninterruptible power supply units, of the plurality of uninterruptible power supply units, to the load in parallel with one another, and to electrically separate each remaining uninterruptible power supply unit from the load.

* * * * *